United States Patent [19]

Komori et al.

[11] 4,163,214

[45] Jul. 31, 1979

[54] CHARACTER RECOGNITION SYSTEM

[75] Inventors: Kazuaki Komori; Takahiko Kawatani, both of Yokosuka; Hiroshi Kaneko, Yokohama; Kenichiro Ishii, Yokosuka, all of Japan

[73] Assignee: Nippon Telegraph and Telephone Public Corporation, Tokyo, Japan

[21] Appl. No.: 902,175

[22] Filed: May 2, 1978

[30] Foreign Application Priority Data

Jul. 12, 1977 [JP] Japan .................................. 52-83734

[51] Int. Cl.$^2$ ............................................. G06K 9/12
[52] U.S. Cl. ...................... 340/146.3 AC; 340/146.3 Y
[58] Field of Search .................. 340/146.3 R, 146.3 Y, 340/146.3 AC

[56] References Cited

U.S. PATENT DOCUMENTS

| | | | |
|---|---|---|---|
| 2,838,602 | 6/1958 | Sprick ........................... | 340/146.3 R |
| 3,112,468 | 11/1963 | Kamentsky .................... | 340/146.3 R |
| 3,346,845 | 10/1967 | Fomenko ....................... | 340/146.3 Y |
| 3,786,416 | 1/1974 | Bhimani ........................ | 340/146.3 AC |
| 3,930,231 | 12/1975 | Henrichon, Jr. et al. .... | 340/146.3 AC |

OTHER PUBLICATIONS

Knoll, "Experiments with Characteristic Loci....", *IEEE Trans. on Computers*, Apr., 1969, pp. 366-372.
Tou et al., "Recognition of Handwritten Characters.....", *IEEE Trans. on Computers*, Jul., 1972, pp. 776-784.
Glucksman, "Multicategory Classification of Patterns.....", *IEEE Trans. on Computers*, Dec., 1971, pp. 1593-1598.

*Primary Examiner*—Leo H. Boudreau
*Attorney, Agent, or Firm*—Armstrong, Nikaido, Marmelstein & Kubovcik

[57] ABSTRACT

A character in a pattern area is optically scanned and the scanned black and white signal cells of the character are stored in a digital memory. The character in the digital memory is recognized through an initial feature extraction process, unification process, concentration process, and recognition process. In the initial feature extraction process each cell thus scanned is encoded according to the presence of a character line or a black cell in a predetermined direction from each cell. The unification process unifies the code of each cell according to a predetermined algorithm, and the concentration process provides a concentrated code for each cell. The recognition process counts each of the concentrated codes and determines the class to which the character to be recognized belongs when the number of particular concentrated codes reaches a predetermined threshold which is defined for each class. The stepping up in the counting of the concentrated code in the recognition process is performed with some conditions, in which, for instance, only when a predetermined concentrated code appears a predetermined number of times, the particular concentrated code is initiated for counting.

5 Claims, 23 Drawing Figures

| 4210 (PAST) \ 4110 (PRESENT) | (1111) □ | (1110) ⊓ | (1101) ⊐ | (1011) ⊔ | (1010) ‖ | (0111) ⊏ | (0101) = |
|---|---|---|---|---|---|---|---|
| (1111) □ | × | × | × | × | × | × | × |
| (1110) ⊓ | (1110) ⊓ | × | × | (1010) ‖ | × | × | × |
| (1101) ⊐ | (1101) = | × | × | × | × | (0101) — | × |
| (1011) ⊔ | (1011) ⊔ | (1010) ‖ | × | × | × | × | × |
| (1010) ‖ | (1010) ‖ | (1010) ‖ | × | (1010) ‖ | × | × | × |
| (0111) — | (0111) ⊏ | × | (0101) — | × | × | × | × |
| (0101) — | (0101) — | × | (0101) — | × | × | (0101) — | × |

I = CODE(0001)

Fig. 6

I = CODE(0001)
∇ = CODE(0010)
H = CODE(0100)
S = CODE(1000)

CHARACTER RECOGNITION SYSTEM

BACKGROUND OF THE INVENTION

The present invention relates to a character recognition system, in particular, relates to a character recognition system which can read many kinds of characters by simple structure.

Two kinds of character recognition systems are known, one of which recognizes a character by observing a line of a stroke of a character, and the other of which recognizes the same by observing the background (white background) behind a character. The stroke analysis method is the typical embodiment of the former recognition system, but it has the disadvantages that it takes a long time to recognize a character among many other characters, and the recognition of a character does not always succeed when a stroke of a character has some width, because of the noise generated in the sharpening step of the stroke. The latter system (background system) has the advantage that character recognition is not affected by noise and/or deformation of the character, but there are some disadvantages in that the recognition ability of each feature is rather low, and when the apparatus is simple, very few classes can be recognized.

Another prior character recognition system has been developed by Glucksman (see Classification of Mixed-Font Alphabetics by Characteristic Loci, IEEE Computer Conf. 1967), the Glucksman's method being said background system. According to the Glucksman's method, four scanning lines are extended from any point in the white background in four directions (right, up, left, and down), and a feature code of each point in the white background is defined according to whether said four scanning lines cross a stroke line of the character. Each of said feature codes has four bits of information. Several feature codes are prepared for all the white cells in the character area, and the recognition of the character is accomplished by counting each feature code and comparing the content of each feature code with the corresponding threshold value. In this method, each element of the feature code is expressed by a ternary code, that is a number of cross points of the scanning line with the character stroke (0, 1, or more than 2) is coded in a ternary code. However, said ternary code system has the disadvantage that distributuion of the feature codes depends too much upon the deformation of a character. And if the feature code is expressed with a binary code, the recognition ability of each feature code is not sufficient. Therefore, neither ternary coding or binary coding are practical for recognizing many classes of characters with a small percentage of error.

Although the Glucksman's method has the advantage that even a deformed character can be recognized, said method has the disadvantage that recognition is very difficult when there are many classes of characters to be recognized, thus, the Glucksman's method which recognizes a character by analysing only the feature of the white background, is not suitable for reading many characters.

One of the proposals for improving the Glucksman's method is the Japanese lay open publication 46,029/76, in which characters are roughly classified by background analysis, and then the stroke method is applied, and the relationship of the coordinates among a plurality of typical points is analyzed. However, this proposal does not completely overcome the disadvantage of the Glucksman's method.

SUMMARY OF THE INVENTION

It is an object of the present invention to overcome the disadvantages and limitations of a prior character recognition system by providing a new and improved character recognition system.

Another object of the present invention is to provide a character recognition system which can easily recognize a plurality of complicated characters.

Still another object of the present invention is to provide a character recognition system which can recognize a character even when the character is deformed.

The above and other objects are attained by a character recognition system comprising; means for optically scanning a pattern area including a plurality of cells each having binary information relating to the cell being either black or white, a digital memory for storing said binary information, means for performing the initial feature extraction process, unification process and concentration process, and means for performing the recognition process. In the initial feature extraction process, a white cell is encoded according to the presence of a character line in a predetermined direction from said white cell, and a black cell is encoded according to the binary value adjacent to the black cell. The unification process substitutes the feature code thus encoded with the code of the adjacent cell according to a predetermined algorithm. The concentration process attaches to each cell the information concerning the related cells. The recognition process counts each of the concentrated codes and determines the class to which the character to be recognized belongs when the number of the particular concentrated codes reaches the predetermined threshold which is defined for each class. The counting of the concentrated code is performed with some conditions, in which, for instance, only when a predetermined concentrated code appears a predetermined number of times beforehand, the particular concentrated code is initiated for counting.

BRIEF DESCRIPTION OF THE DRAWINGS

The foregoing and other objects, features, and attendant advantages of the present invention will be appreciated as the same become better understood by means of the follwoing description and accompanying drawings wherein.

DESCRIPTION OF THE PREFERRED EMBODIMENTS

First, the theoretical principle of the present invention is explained. According to the present invention, a character with an arbitrary font is drawn in the area, for instance of 5 mm×7 mm, and the width of the stroke or the line of a character is distributed between 100 $\mu$m to 700 $\mu$m, if the character is written using a mechanical pencil having a 0.5 mm$\phi$ lead. Said area is divided into a plurality of cells (M number of cells in the horizontal direction and N number of cells in the vertical direction) each of which is 150×150 $\mu m^2$, and the information concerning whether each cell is black or white is provided by an electronics apparatus. Of course, a black cell means that the cell is within a line of the character, and a white cell means that the cell is in the background. A threshold level is established in the electronic apparatus for discrimination of white cells and black cells. The electronic apparatus has a self-scanning type image pick-up means like CCD, or MOS for converting the picture signal to an electrical signal. The electrical signal concerning the brightness of each cell is stored in a memory to be processed. The memory has, for instance, 21 bits for each cell. The contents of 21 bits are, one bit for distinguishing white and black cells, 4 bits (4×1) for storing the feature code of the cell itself, 16 bits (4×4) for the concentration process. The recognition of a character is accomplished by applying (a) an initial feature extraction process, (b) a unification process, (c) a concentration process, and (d) recognition process to each of the cells.

Next, each of the above mentioned processes will be explained.

(a) An initial feature extraction process.

Figure 1A:
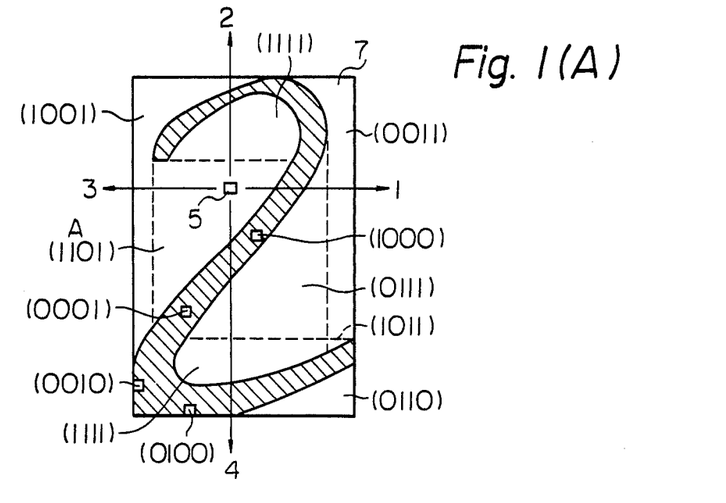
FIG. 1(A) shows the principle of the initial feature extraction step according to the present invention.

FIG. 1(A) shows the initial feature extraction process, when a cell is white, the cell 5 in the pattern area 7 extends four scanning lines 1, 2, 3 and 4 hypothetically. The scanning lines 1, 2, 3 and 4 extend in right, up, left and down directions, respectively. The cell 5 is encoded according to whether each scanning line 1, 2, 3 and 4 cross the strokes of a character, and when the scanning line crosses the character, the related bit of the code is designated one, otherwise the related bit is zero. For instance, for the cells in the area A, the arrow 1 crosses the stroke, the arrow 2 also crosses the stroke, the arrow 3 does not cross the stroke, and the arrow 4 crosses the stroke. Accordingly, assuming that the arrows crossing with the stroke are indicated by one, and the arrows which do not cross with the stroke are indicated by zero, the code of the cell 5 in the area A is (1101), in which the first bit (1) relates to the arrow 1 in the right direction, the second bit (1) relates to the arrow 2 in the up direction, the third bit (0) relates to the arrow 3 in the left direction, and the fourth bit (1) relates to the arrow 4 in the down direction. The above operation is accomplished for all the white cells in the pattern area 7, and each partial area in the pattern area 7 has the codes as shown in FIG. 1(A).

Figure 1B:
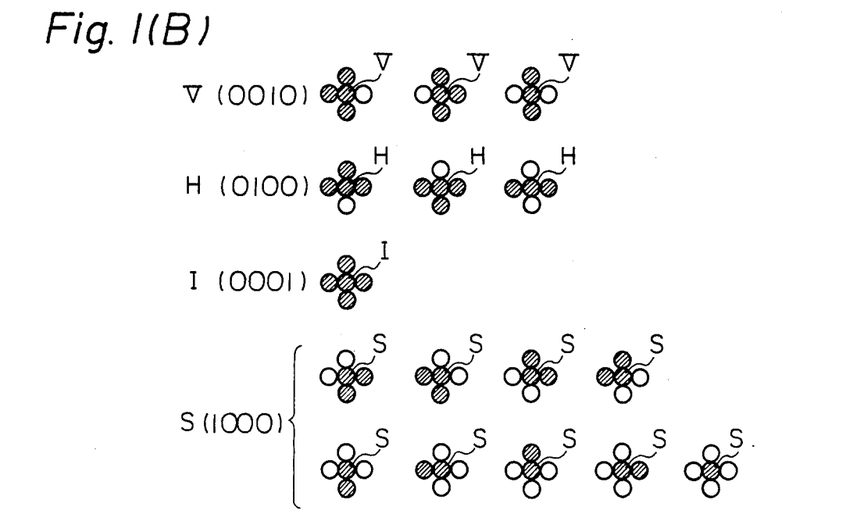
FIG. 1(B) shows the principle of the coding of a black point in the initial feature extraction step.

When a cell is black, the cell is classified into four points, they are, horizontal point (H), vertical point (V), slant point (S), and internal point (I), those points also having a four bit code. The horizontal point (H) is designated by (0100), the vertical point is (0010), the slant point is (1000), and the internal point is (0001). The horizontal point (H) is defined as that in which both the right and left cells are black and one of the up and down cells is white, the vertical point (V) is defined as that in which both the up and down cells are black and one of the left and right cells is white. The internal point (I) has four black cells in all the right, left, up and down directions, and the slant point (S) is the point which does not belong to any other point (H, V, I). FIG. 1(B) shows the principle of coding a black point as explained above.

Figure 1C:
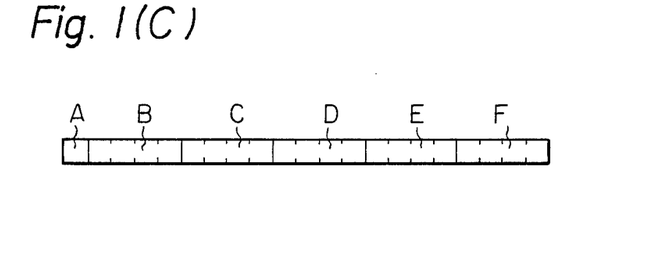
FIG. 1(C) shows the structure of the coded word of each cell.

When the initial feature extraction process is finished, the code of each cell is stored in a memory having a format shown in FIG. 1(C). In the format of FIG. 1(C), the area A having a single bit designates whether the cell is black or white (one for a black cell and zero for a white cell), the area B having four bits stores the initial feature code of the cell as shown in FIG. 1(A), and the areas C, D, E and F are left blank for the concentration process which will be described later.

(b) A unification process.

The purpose of this process is to distinguish whether each segment of the character line is separated from another segment, and whether the character line is looped. This process is accomplished by comparing the initial feature code of each cell obtained in said initial feature extraction process with the initial feature code of the cell positioned next to that particular cell, and the initial feature code of the particular cell is replaced with that of the next cell according to a predetermined algorithm. The unification process unifies the related feature codes and removes the noise generated by the distortion and/or slant of the character. The unification process also clarifies whether the character line is closed or open.

In the unification process, all the feature codes of all the cells in the pattern area 7 are scanned in the memory. The scanning is performed four times. The first scanning is carried out vertically from the bottom to the top and from the left to the right as shown in FIG. 2(B)-(a). The second scanning is carried out as shown in FIG. 2(B)-(b) from the top to the bottom and from the left to the right. The third scanning is carried out as shown in FIG. 2(B)-(c) from the left to the right and from the top to the bottom and the fourth scanning is from the right to the left and from the top to the bottom as shown in FIG. 2(B)-(d). The four scannings are repeated when necessary.

Figure 2A:
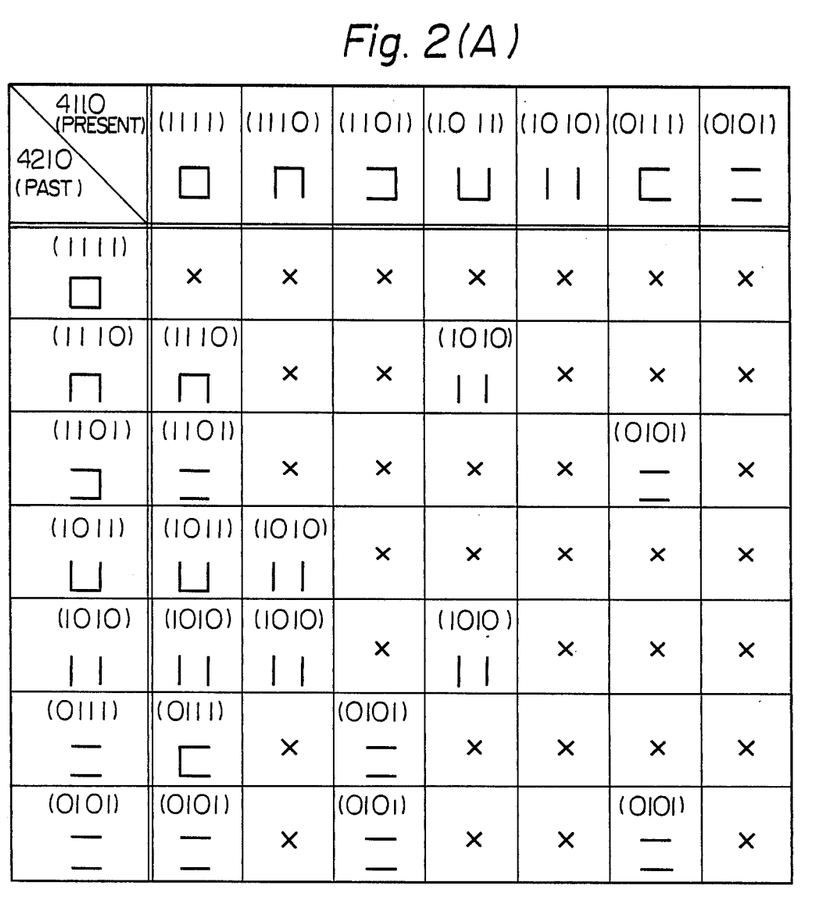
FIG. 2(A) shows the translation table in the unification step according to the present invention.
Figure 2B:
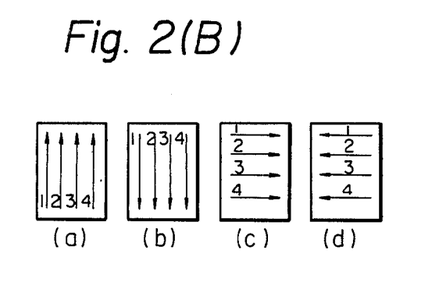
FIG. 2(B) shows the scanning operation in the unification step.

FIG. 2(A) shows the algorithm of the unification process. A pair of feature codes, the past feature code and the present feature code on the time sequence in the scanning operation are compared with each other, and according to the algorithm in FIG. 2(A) one feature code is replaced by the other feature code. In FIG. 2(A), the feature code (1111) which has black lines in all four directions is indicated as □, the feature code (1110) which has black lines in the up, left and right directions but not in the down direction is indicated as ⊓ . No replacement is carried out for the relationships shown by the symbol (x) in FIG. 2(A) and for any relationships not shown in FIG. 2(A).

For instance, when the past feature code is ((1101), ⊐ ), and the present feature code which follows the past feature code in the scanning time sequence is ((1111), □), the present feature code is replaced by ((1101), ⊐ ), thus, both feature codes are unified to the code ((1101), ⊐ ).

Figure 2C:
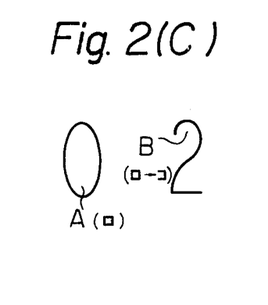
FIG. 2(C) shows the effect of the unification step.

FIG. 2(C) shows an example of the result of the unification process. For instance, the initial feature code of the area B in the character "2" in FIG. 2(C) is ((1111), □), and said initial feature code is changed to ((1101), ⊐ ) through the unification process. It should be appreciated that the feature code in the looped area of the character "0" is ((1111), □), and the unification process clarifies the difference between "2" and "0".

The four scannings are carried out until no replacement is performed or the scanning is repeated by a predetermined number of times.

(c) A concentration process

The purpose of this process is to concentrate the information of each feature code by attaching the feature codes of the four related cells in four directions (up, down, left and right), and to facilitate the following recognition process. The algorithm of the concentration process is as follows.

When the cell to be concentrated is a black cell, the feature code of a white cell which the scanning line in one of the four directions meets first is attached. Since four scanning lines have four feature codes, the resultant code has five feature codes, among them is the original one, and the rests are attached. The attached four codes are stored in the areas C, D, E and F in the format of FIG. 1(C).

On the other hand, when the cell to be concentrated is a white cell, the feature code of a white cell which the scanning line in one of the four directions meets first beyond a black cell, is attached.

Wnen there is no black cell in a particular direction, the code (0000) is attached to the code to be concentrated. Of course four feature codes are attached to each original code and the resultant concentrated code has five feature codes which are stored in the format in FIG. 1(C).

Figure 3:
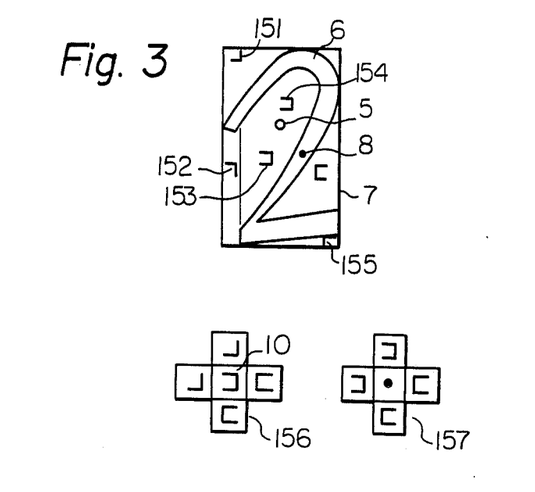
FIG. 3 shows the principle of the concentration step according to the present invention.

FIG. 3 shows the embodiment of the unification process and the concentration process on the pattern area 7. In the figure, the symbol 151 indicates that the cell in this area has the character line 6 in the right and down directions, similarly, the symbol 152 indicates the presence of the character line in the right and up directions, and the symbol 153 shows the presence of the character line in the up, right and down directions. Also, the symbol 155 shows the presence of the character line in the up and left directions. In the area of 154, the feature code is ((1111), □) before the unification process, and said feature code is changed to that of 153 through the unification process. The original cell 5, the feature code of which is shown by the reference numeral 10, is concentrated by attaching four feature codes in four directions. As explained before, each of the attached feature codes is the code of the first white cell which each scanning line meets beyond the character line. Thus, the structure of the character is concentrated in the code of the cell 5. Similarly, the black cell 8 is concentrated by attached four white feature codes which the scanning line in each direction meets first, thus the code of the black cell 8 is concentrated as shown 157.

It should be noted that through the concentration process the quantity of information concerning each cell is increased, therefore, the following recognition process has to process less cells, thus, the structure of the recognition system can be simplified.

(d) A recognition process

Figure 4:
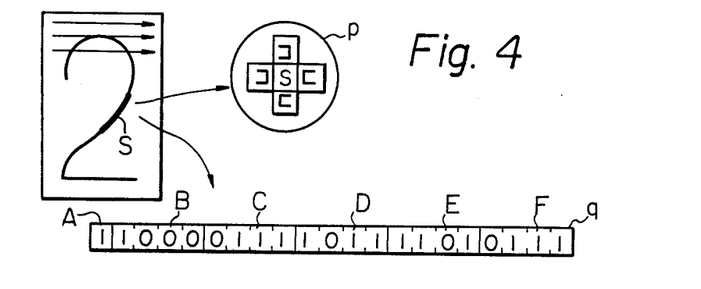
FIG. 4 shows the principle of the recognition step according to the present invention.

Through the recognition process, the character is recognized by detecting the fact that the number and the combination of each concentration code defined for each character exceeds predetermined number. FIG. 4 shows the embodiment of the recognition process, in which the concentration code of the inclined portion (S) of the character "2" is shown in the circle (p), and the binary expression of the same is shown in the format (q). In the format, the area A has a binary one which indicates a black cell, the area B has the code (1000) which indicates that the black cell is a slant point (S). The areas C, D, E and F show that the feature code of the white cell which the scanning line in the right direction meets first is ((0111), ⊐ ), ((1011), ⊐ ) in the up direction, ((1101), ⊐ ) in the left direction, and ((0111), ⊏ ) in the down direction, respectively (see FIG. 2(A)). Accordingly, when the concentrated pattern (1100001111101111010111) appears more than a predetermined number of times among all the input patterns, it is deemed that the character has the important feature for "2".

As explained above, the recognition process counts each of the concentrated codes, and recognizes the character when the number of each of the concentrated codes exceeds the predetermined threshold.

The value of the threshold is not necessarily defined for each independent concentrated code, but the algorithm is possible that when the total of X concentrated codes and Y concentrated codes exceeds a predetermined value, the particular character is recognized.

Further, a conditional counting of a concentrated code is possible for the recognition of a character, that is to say, in the scanning from left to right and up to down, in FIG. 4, the concentrated code (Y) is counted on the condition that the other concentrated code (X) appears a predetermined number of times before the code (Y). Otherwise, the code (Y) is not counted even though the code (Y) appears solely. The conditional counting facilitates the correct recognition of a character even when considerably deformed and/or inclined.

Figure 5A:
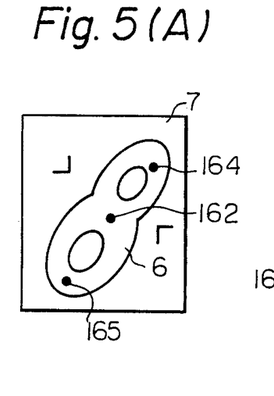
FIG. 5(A), FIG. 5(B) and FIG. 5(C) show the principle of modification of the recognition step according to the present invention.
Figure 5B:
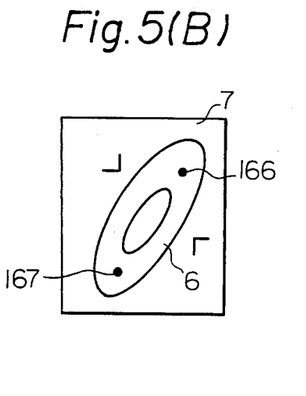
Figure 5C:
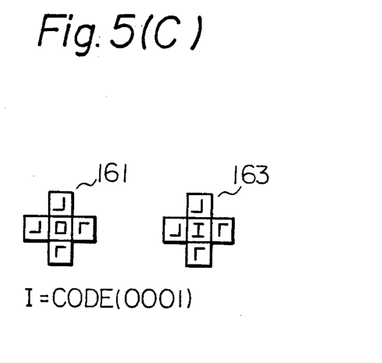

FIG. 5 shows the effect of said conditional counting. In the figure, the character "8" is inclined, and is fat so that there is almost no narrow part or waist-line at either the right and the left sides (FIG. 5(A)). In this case the character "0" in FIG. 5(B) is confusable with the character "8". Assuming that the concentration process is carried out for four directions (up, left, right and down) as explained above, the concentrated code of the white cells in both the loops of the character "8" is shown by the reference numeral 161, since the loops of the character "8" do not overlap with each other in the vertical direction due to the deformation. And it should be noted that the concentrated code of the white cell in the loop of the character "0" is also shown by 161.

Further, the concentrated code of the black cell 162 which resides between the loops of the character "8" is shown by the reference numeral 163, and the concentrated code 163 appears also at the areas 162, 164 and 165 of the character "8", and at the areas 166 and 167 of the character "0". Accordingly, when the number of white cells in the loops of the character "8" is the same as the number of the white cells in the loop of the character "0", the number of concentrated codes 161 and 163 for the character "8" may be the same as that for the character "0". Thus, the character "8" can not be distinguished from the character "0".

However, conditional counting can solve the above problem. That is to say, when the pattern area is scanned from left to right, and from up to down, (a) the concentrated code 163 is counted only when a predetermined number of code 161 within a certain range appears before the code 163, (b) next, the code 161 is counted on the condition that the code 163 is counted within a predetermined range of times according to the step (a), and (c) the occurrences of the codes 161, 163 and 161 are in the predetermined ranges, respectively. This algorithm recognizes the character "8" without confusing it with the character "0".

As apparent from the above embodiment, conditional counting, which takes into consideration the sequence of the concentration codes, facilitates recognition of many characters without increasing the information in the concentrated code even when the quality of the character to be recognized is rather poor.

Figure 6:
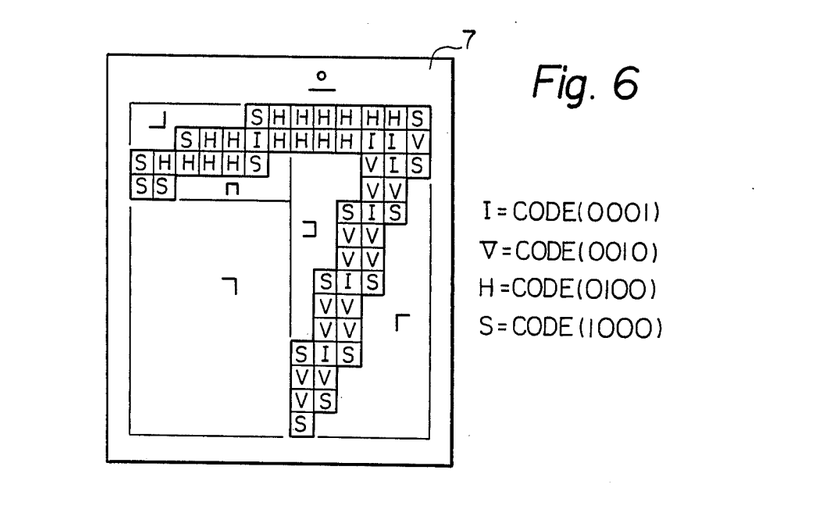
FIG. 6 is an explanatory drawing in which the branch and the slope of a black line can be recognized using a concentrated code of the black points.

FIG. 6 shows the effect of coding a black cell: that a black cell is classified into an internal point (I), a horizontal point (H), a vertical point (V) and a slant point (P). By designating one or a plurality of concentrated codes of black cells, the angle or branch of a character line is recognized without tracing the character line. And further, it should be noted that each number of horizontal points, vertical points and slant points included in the branch show the average angle of the branch when the size of the pattern is defined. Actually, in FIG. 6, many horizontal points (H) are included in the almost horizontal branch, and many vertical points (V) are included in the almost vertical branch. And it should be appreciated of course that a branch which have many slant points (S) is inclined, on the average, by 45 degrees.

Now, the character recognition system using the principle explained hereinbefore will be described.

Figure 7:
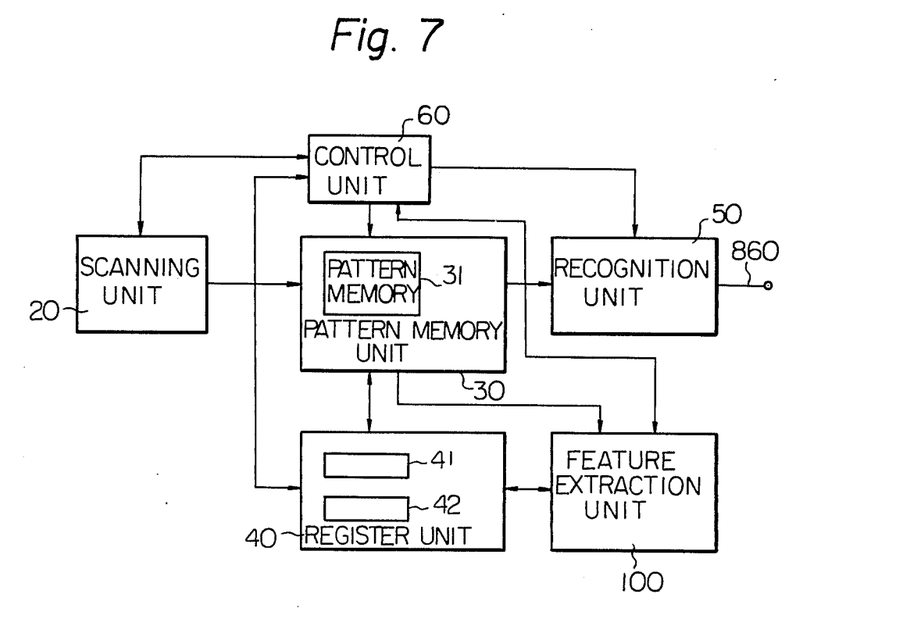
FIG. 7 is a general block-diagram of the character recognition system according to the present invention.

FIG. 7 is a block-diagram of the character recognition system according to the present invention, and in this figure, the reference numeral 20 is a scanning unit, 30 is a pattern memory unit, 31 is a pattern memory, 40 is a register unit, 41 is a present register, 42 is a past register, 50 is a recognition unit, 60 is a control unit, 100 is a feature extraction unit, and 860 is an output terminal.

In operation, the scanning unit 20 scans the paper on which a character to be recognized is written under the control of the control unit 60. Through the scanning, a binary signal corresponding to the black or white condition of each cell in the pattern area 7 (FIG. 1(A)) is obtained and stored in the pattern memory 31. Each word of the memory stores the information of each cell, and a word of the memory has 21 bits. It is supposed that the address of the pattern memory corresponds to the position of the cells in the pattern area. When all the cells are scanned and stored in the memory, only the first bit (the area A in FIG. 1(C)) is full, containing one or zero according to the black or white condition of each cell.

Next, the control unit 60 causes the pattern memory unit 30 to perform the raster scanning of the pattern memory 31. The raster scanning is performed by scanning the cells from left to right (the arrow 1 in FIG. 1(A)), from down to up (the arrow 2 in FIG. 1(A)), from right to left (the arrow 3 in FIG. 1(A)), and from up to down (the arrow 4 in FIG. 1(A)). In the raster scanning, each word thus scanned is transferred to the register unit 40. The register unit 40 has two registers for storing the information of two adjacent cells in the raster scanning, and when the word in the memory 31 is read, the output of the memory is transferred to the present register 41, and the previous content of the present register 41 is transferred to the past register 42. Thus, the past register 42 stores the information of the cell of the previous scanning cycle. Both the output of the present register 41 and the past register 42 are applied to the feature extraction unit 100, which performs the initial feature extraction process, the unification process and the concentration process by changing the content of the present register 41 when necessary. After each process, the content of the present register 41 is returned to the original address of the pattern memory 31 and is also transferred to the past register 42. When the necessary processes using the pattern memory unit 30, the register unit 40 and the feature extraction unit 100 finish, the content of the pattern memory 31 is transferred to the recognition unit 50, which counts on a predetermined condition a predetermined concentrated code sent from the pattern memory unit 31, and the result thus determined is sent to the output terminal 860. The feature extraction unit 100, which is the important feature of the present invention, is embodied using a conventional logic circuit.

Since only two words of information relating to two adjacent cells are applied to the input of the feature extraction unit 100, the initial feature extraction process is carried out with a simple apparatus including the pattern memory unit 30, the register unit 40 and the feature extraction unit 100 under the control of the control unit 60.

Figure 8:
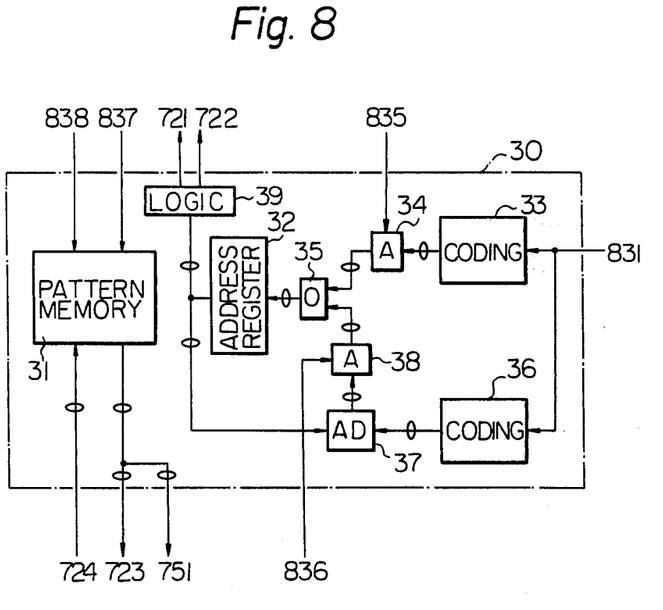
FIG. 8 is the block-diagram of the pattern memory in FIG. 7.

FIG. 8 shows the block-diagram of the pattern memory unit 30. The function of the unit in FIG. 8 includes the generation of the address of the memory and transmitting and receiving data to and from the register unit 40. The capacity of the pattern memory 31 depends upon the size of the pattern area 7, and it is supposed that the number of cells in both the vertical and horiziontal directions in the pattern area is expressed as a power of 2. In order to provide the initial address to the memory address register 32, the input signal from the line 831 which is connected to the control unit 60, is encoded in the encoder 33, the output of which is applied to the memory address register 32 through the AND circuit 34 and the OR circuit 35 at the timing of 835. The line 831 actually has four lines, each of which is energized by the raster scanning from left to right and from up to down (see FIG. 2(B)-c), from right to left upwards (see FIG. 2(B)-d), downward from left to right (see FIG. 2(B)-b), and upward from left to right (see FIG. 2(B)-a), respectively, according to the raster scanning of the pattern memory 31. Therefore, the initial address of the memory address register 32 relates to the cell of the extreme left at the top line, the cell of the extreme right at the top, the cell of the extreme right at the bottom, and the cell of the extreme left at the bottom, respectively, in each raster scanning. Next, in order to step up or add to the content of the memory address register 32, the output of the encoder 36 which encodes the signal on the line 831, and the output of the memory address register 32 are added to each other in the adder 37. The output of the adder 37 is applied to the memory address register 32 through the AND circuit 38 and the OR circuit 35 at the timing of 836.

The output of the encoder 36 is so provided that the address of the memory address register 32 is step-up or step-down in single units according to the horizontal or vertical scanning of the pattern area 7. When the output of the memory address register 31 is at the initial point of each scanning line and at the end point of the scanning line, the logic circuit 39 provides the output signal on the lines 721 and 722, respectively. The line 721 is connected to the feature extraction unit 100, and the line 722 is connected to both the feature extraction unit 100 and the register unit 40. Other lines 723, 751 and 724 are provided for transferring the content of the pattern memory 31 to the register unit 40, transferring the same to the recognition unit 50, and storing the data of the register unit 40 in the pattern memory 31, respectively. Further, the lines 837 and 838 transmit the write signal from the control unit 60, and the read signal to the control unit 60, respectively.

Figure 9:
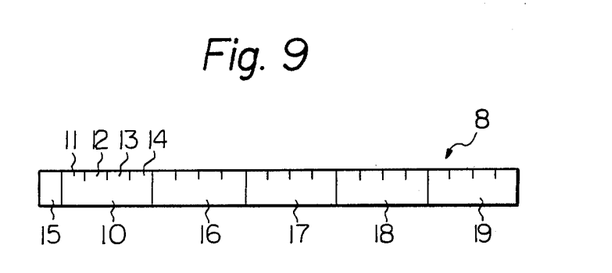
FIG. 9 is the structure of a word in the pattern memory in FIG. 8.

FIG. 9 shows the structure of the word of the pattern memory 31. The word 8 is provided for each cell in the pattern area 7, the area 15 in the word 8 is set to one when the cell is black and set to zero when the cell is white. The area 10 is the feature code area and 11, 12, 13 and 14 are feature element bits relating to left, up, right and down scanning lines, respectively. 16, 17, 18 and 19 are the features code areas for the adjacent white cells for the concentration process. In those areas, the feature code of the white cell that the scanning lines in the right, up, left and down directions first meets beyond the character line are stored, when the cell to be concentrated is white. And, when the cell to be concentrated is black, the feature code of the white cell in those directions that the scanning lines meet first is stored. Accordingly, each word has enough information for showing the structure around the cell to be concentrated, and thus, facilitates the successive recognition process.

Figure 10:
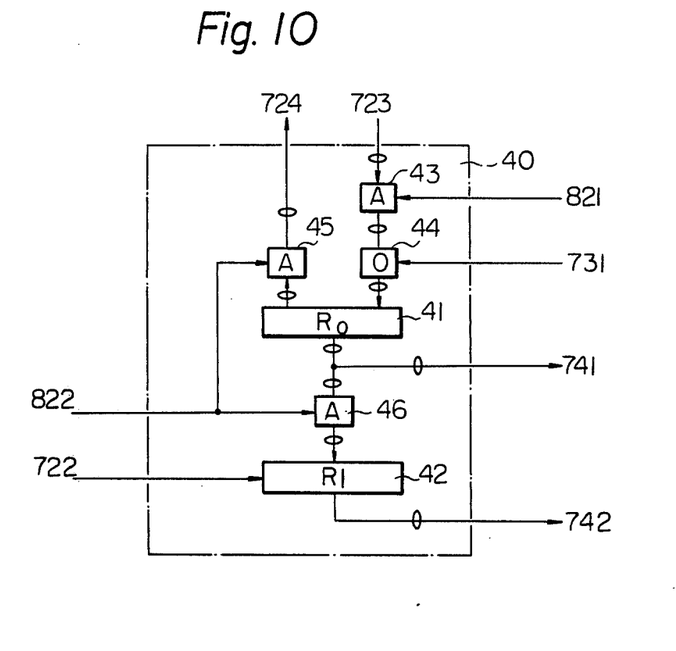
FIG. 10 is the block-diagram of the register unit in FIG. 7, FIG. 11(A) and FIG. 11(B) show the bit structure of the present register and the past register in the register unit in FIG. 10.

FIG. 10 shows the block-diagram of the register unit 40. The content of the pattern memory on the line 723 is set to the present register 41 through the AND circuit 43 and the OR circuit 44 at the timing of 821. And the content of the present register 41 is transferred to the pattern memory 31 through the AND circuit 45 at the timing of 822 under the control of the control unit 60. The line 731 is provided for transferring the data from the feature extraction unit 100 to the present register 41 through the OR circuit 44. The lines 741 and 742 are provided to transfer the content of the present register 41 and the past register 42, respectively, to the feature extraction unit 100. The AND circuit 46 receives the timing signal through the line 822 and causes the present register to transfer the content of the same to the past register 42. The line 722 which is connected to the control unit 60 provides the reset signal to the past register 42.

Figure 11:
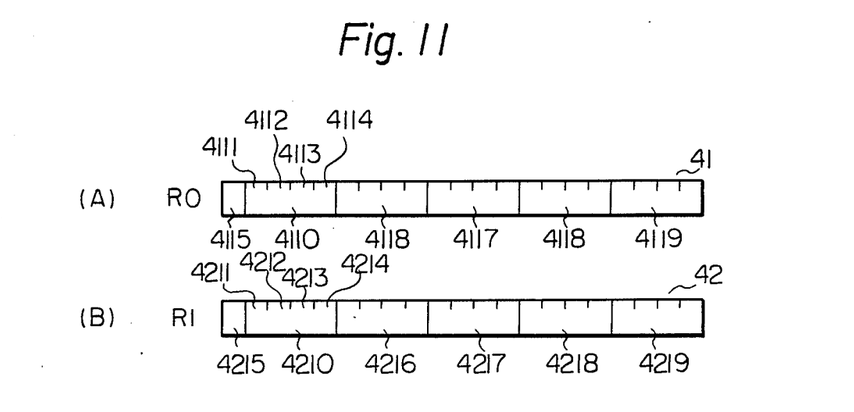

FIG. 11(A) and FIG. 11(B) show the word structure of the present register 41 and the past register 42, respectively. The word structure of those registers is the same as that of the word structure 8 of the pattern memory 31. The relationship between the registers and the pattern memory is, 4115 and 4215 correspond to 15, 4111 and 4211 correspond to 11, 4112 and 4212 to 12, 4113 and 4213 to 13, 4114 and 4214 to 14, 4110 and 4210 to 10, 4116 and 4216 to 16, 4117 and 4217 to 17, 4118 and 4218 to 18, and 4119 and 4219 correspond to 19.

Figure 12:
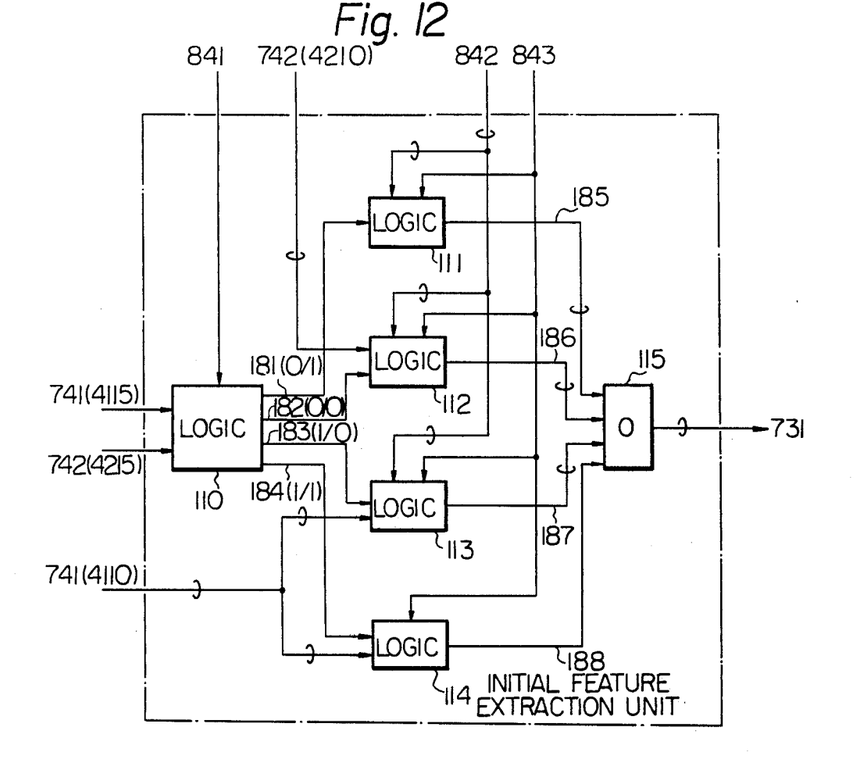
FIG. 12 is the block-diagram of the initial feature extraction unit in FIG. 7.

FIG. 12 is the embodiment of the block-diagram of the initial feature extraction circuit in the feature extraction unit 100. The function of this circuit is to generate the feature code 10 of all the cells in the pattern area by scanning the pattern area 7. The scanning of the pattern area is carried out four times, they are, vertical scanning from the left bottom to the right top (see FIG. 2(B)-(a)), vertical scanning from the left top to right bottom (see FIG. 2(B)-(a)), horizontal scanning from the left top to the right bottom (see FIG. 2(B)-(c)), and horizontal scanning from the right top to the left bottom (see FIG. 2(B)-(d)). The logic circuit receives three inputs 841, 741 and 742. The line 841 indicates that the process is in the initial feature extraction step under the control of the control unit 60. The line 741 is connected to bit 4115 of the present register 41, and shows whether the cell to be processed is black or white. The line 742 is connected to bit 4215 of the past register 42, and shows whether the cell in that register is black or white.

The logic circuit 110 provides the output signal on the;

(a) output line 181 when the status of bit 4115 is "0" and the status of bit 4215 is "1",
(b) output line 182 when the status of bit 4115 is "0" and the status of bit 4215 is "0",
(c) output line 183 when the status of bit 4115 is "1" and the status of bit 4215 is "0", and
(d) output line 184 when the status of bit 4115 is "1" and the status of bit 4215 is "1".

The line 842 carries the signal which indicates the direction of scanning in the pattern memory 31, and said signal is provided from the control unit 60. The line 843 carries the timing signal from the control unit 60 and defines the output of the timing from the logic circuits 111, 112, 113 and 114. The logic circuit 111 determines which bit position in the area 4110 of the present register 41 is to be set by the signal on the line 181, under the control of the signal on the line 842, and the output of the logic circuit 111 is provided on the output line 185. The function of the logic circuit 111 is shown in detail in (C) of the table 1.

The logic circuit 112 receives the signal on the line 742 which is connected to the bit area 4210 of the past register 42, on the condition that both the signals on the lines 182 and 842 are positive, and transferrs the signal from the area 4210 to the bit area 4110 of the present register 41 through the output line 186 according to the timing signal 843. Detailed operation of the logic circuit 112 is shown in (A) of table 1.

The logic circuit 113 provides a particular code on the output line 187, according to the signal on the line 741 relating to the bit area 4110 of the present register 41, and the signal on the 842 relating to the scanning direction, when the signal on the line 183 is one and the timing signal on the line 843 is one. Said particular code on the output line 187 is to be set at the bit area 4110 of the present register 41. Detailed operation of the logic circuit 113 is shown in (B) of the table 1.

The logic circuit 114 provides a a particular code on the output line 188 in order to set the bit area 4110 of the present register 41, according to the signal on the line 741 connected to the bit area 4110 of the present register 41, when the signal on the lines 184 and 843 are one. Detailed operation of the logic circuit 114 is shown in (D) of the table 1.

Each signal on the lines 185, 186, 187 and 188 is set to one of the bit positions 4111, 4112, 4113 aand 4114 of the present register 41 through the OR circuit 115 and the line 731.

flip-flop 124. The data on the line 122 is applied to the area 4110 of the present register 41 through the AND circuit (A) which is gated by the timing signal on the line 843 connected to the control unit 60. The output of the flip-flop 124 is connected to the control unit 60 through the line 845 to inform that the code conversion shown in FIG. 2(A) is actually carried out during the scanning set of the pattern memory 31. The flip-flop 124 is reset to zero by the signal on the line 721, which is energized by the control unit 60 when the scanning is initialized at the beginning of each scanning set.

It should be appreciated that FIG. 2(A) shows the conversion on the feature code between the area 4110

Table 1

| 4115 (Present) 4215 (Past) | | 0 | | | | 1 | |
|---|---|---|---|---|---|---|---|
| | | Scanning direction (see Fig. 1(A)) | Process | | | Scanning direction (see Fig. 1(A)) | Process |
| 0 | (A) | 1 | 4213→ 4113 | (B) | | | code 0100→ 4110 |
| | | 2 | 4214→ 4114 | | | 2 and 4 | (Horizontal position) |
| | | 3 | 4211→ 4111 | | | | When (4110)=code 0100, code 1000→ 4110 (slant point) |
| | | 4 | 4212→ 4112 | | | 1 and 3 | When (4110)≠code 0100, 1000 code 0010→ 4110 (vertical point) |
| | | Scanning direction (see Fig. 1(A)) | Process | | | | Process |
| 1 | (C) | 1 | 181→ 4113 | (D) | | | When (4110)=code 0100, 1000, 0010, code 0001→ 4110 (internal point) |
| | | 2 | 181→ 4114 | | | | |
| | | 3 | 181→ 4111 | | | | |
| | | 4 | 181→ 4112 | | | | |

Figure 13:
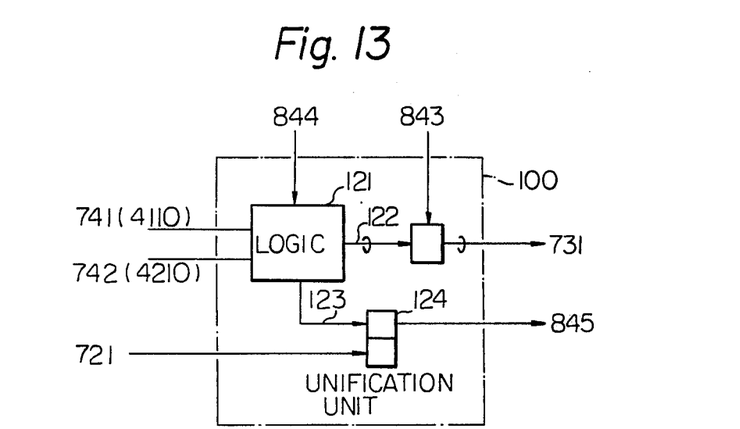
FIG. 13 is the block-diagram of the unification unit in FIG. 7.

FIG. 13 is the block-diagram of the unification circuit 40 included in the feature extraction unit 100. The unification circuit functions to compare the feature code 10 of the white cell in the pattern area 7 generated in the initial feature extraction process, with the adjacent feature code of the white cell, and to change the feature code when necessary. The unification process thus unifies the feature codes, removes the deformation and/or the slant of the character, and clarifies the status of convexity and concavity formed by the character lines. In order to perform the unification process, the pattern memory 31 is scanned four times, the first vertical scanning from left bottom to right top, the second vertical scanning from left top to right bottom, the third horizontal scanning from left top to right bottom, and the fourth horizontal scanning from right top to left bottom. Said scanning set is repeated until there is no code to be unified, or the scanning is carried out a predetermined set of times. In FIG. 13, the logic circuit 121 carries out the code conversion shown in FIG. 2(A) according to the signal on the bit area 4110 of the present register 41 on the line 741, and the signal of the bit area 4210 of the past register on the line 742, on the condition that the signal on the line 844 is one which shows under the unification process. The line 844 is connected to the control unit 60. The converted result is provided on the output line 122. The line 123 is energized when the code conversion shown in FIG. 2(A) is actually carried out, and the signal on the line 123 sets the set-reset type and the area 4210. For instance, when the content of the area 4110 is (1111) and the content of the area 4210 is (1110), the code (1110) is inserted in the area 4110 of the present register 41 to prepare the scanning of the next cell. That is to say, when the present cell has the pattern (1111) and the area 4210 of the past register which corresponds to said present cell has the code (1110), the pattern of the area 4210 of the past register at the next scanning cycle is (1110). To interpret the above operation, when the past cell has an open pattern towards bottom (⊓, 1110), and the present cell has a closed pattern (▢, 1111), the present cell is changed to the open pattern towards bottom (⊓, 1110), and this present pattern is transferred to the past cell in the next scanning cycle.

Figure 14:
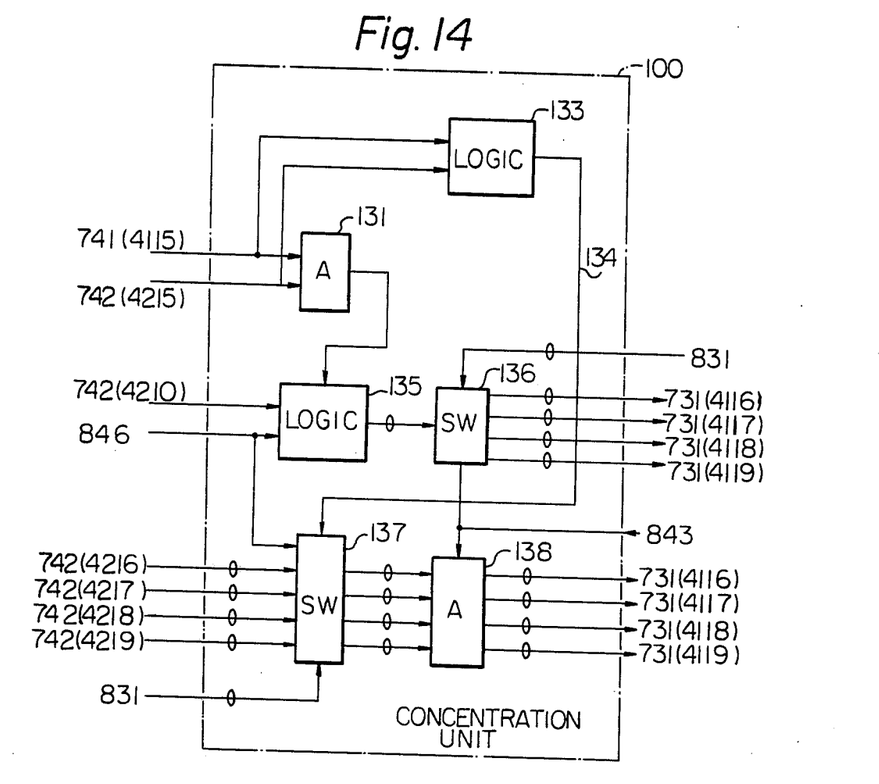
FIG. 14 is the block-diagram of the concentration unit in FIG. 7.

FIG. 14 shows the concentration circuit included in the feature extraction unit 100. The function of the concentration circuit is to concentrate the topological property of the white cells and the black cells by attaching the feature codes of the adjacent cells to each cell, and to facilitate the following recognition process. As explained previously, when the cell to be concentrated is black, the four feature codes of the four white cells which the scanning lines meet first in four directions (right, up, left and down), are attached to said black cell, and when the cell to be concentrated is white, the four feature codes of the four white cells which the scanning lines meet first in four direction beyond the black line are attached to said white cell. In FIG. 14, the AND circuit 131 provides an output signal when the line 741 connected to the bit 4115 of the present register 41 has the signal one and the line 742 connected to the bit 4215 of the past register 42 has the signal zero, and the logic circuit 133 provides the negation of the AND circuit 131. The logic circuit 135 passes the signal on the line 742 which connects the bit 4210 of the past register 42 to the switch 136 only when the line 846 which is connected to the control unit 60 has the signal one showing under the concentration process, and the AND circuit 131 provides the output signal. The switch 137 carries out the following switching according to the scanning direction of the pattern memory 31 indicated on the line 831, using the timing siganl on the line 846 from the control unit 60;

(a) In case of the horizontal scanning from the left top to the right bottom, the signal of bit position 4218 of the past register 42 is transferred to bit position 4118 of the present register 41 through the AND circuit 138 and the line 731.

(b) In case of the horizontal scanning from the right bottom of the left top, the signal of bit position 4216 of the past register 42 is transferred to bit position 4116 of the present register 41 through the AND circuit 138 and the line 731.

(c) In case of the vertical scanning from the left top to the right bottom, the signal of bit position 4217 of the past register 42 is transferred to bit position 4117 of the present register through the AND circuit 138 and the line 731.

(d) In case of the vertical scanning from the right bottom to the left top, the signal of bit position 4219 of the past register 42 is transferred to bit position 4119 of the present register 41 through the AND circuit 138 and the line 731.

The AND circuit 138 is opened by the timing signal on the line 843. It should be noted that bits 4216, 4217, 4218 and 4219 of the past register 42 are connected respectively to the bits 4116, 4117, 4118 and 4119 of the present register 41 through the lines 742 and 731.

The operation explained in accordance with FIG. 14 is summarized as follows. Supposing that the scanning of the pattern area 7 is carried out in FIG. 3 in the horizontal right direction, the AND circuit 131 provides the output signal when the scanning point enters a black cell from a white cell (the boundary point is called the point c), and the process to retain the information that a white cell resides to the left is carried out. When the scanning point goes further and reaches the next white cell, or goes to another black cell, or reaches another white cell from the white cell, the logic circuit 133 provides an output signal and causes the process to transfer the information that there is a white cell to the left, to each white or black cell.

Figure 15:
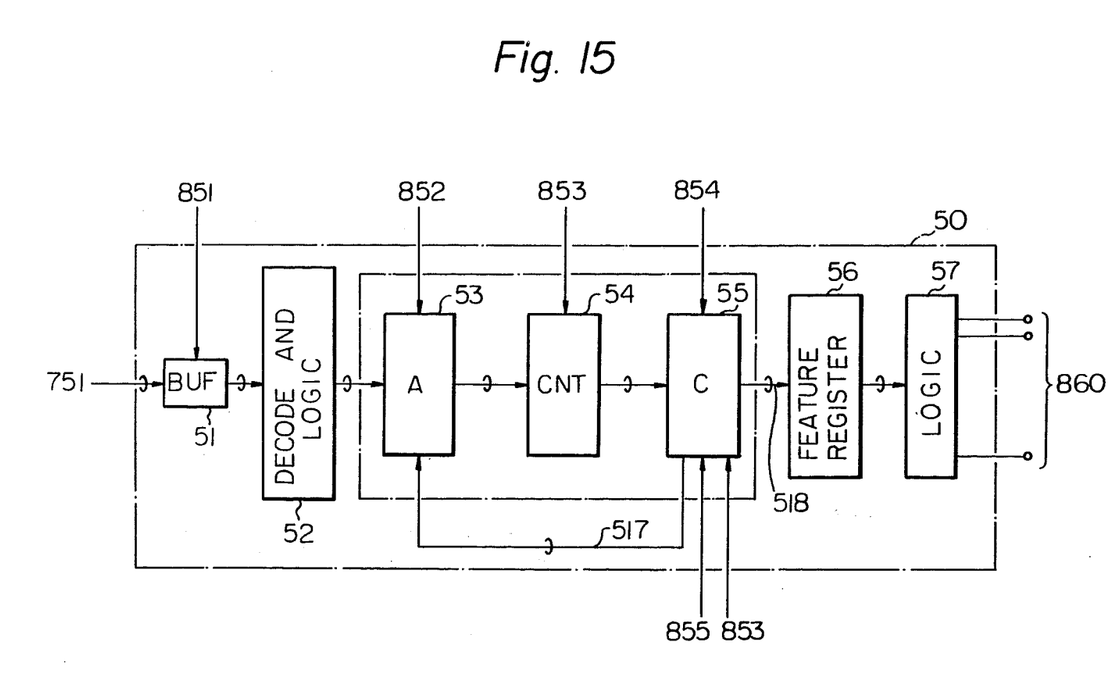
FIG. 15 is the block-diagram of the recognition unit in FIG. 7.

FIG. 15 is the block-diagram of the recognition unit 50. When the job of the feature extraction unit 100 has finished, the pattern memory 31 is scanned only once in a predetermined direction, for instance, from the left top to the right bottom, and the scanning output is applied to the buffer register 51 through the line 751 at the timing of the line 851 which is connected to the control unit 60. The output of the buffer register 51 is applied to the decode-logic circuit 52. The decode-logic circuit 52 is designed according to the structure of the characters to be recognized, and decodes the input signals selectively, and the logical sum of the decoded signals of similar kind is provided at the output of the circuit 52.

The AND circuit 53 gates the logical sum with the gate signals of the output 517 of the comparator 55 and the timing signal on the line 852 which is connected to the control unit 60. The output of the AND circuit 53 is applied to the feature counter group 54. The feature counter group 54 is supposed to be reset by the signal on the line 853 from the control unit 60 before the recognition process begins. When scanning of the pattern memory 31 has finished, the content of the feature counter group 54 is compared with the content of the comparator group 55, at the timing of the line signal 854 from the control unit 60, and the result of the comparison is applied to the feature hold register 56 in binary form. It should be noted that the comparator 55 has a plurality of constants for each character to be recognized, and the constant is determined according to the feature to be recognized. The logic circuit 57 is a combination of AND circuits and OR circuits, the wiring of which is defined by connecting each bit of the feature hold register to one another according to the structure of the character to be recognized. The logic circuit 57 has a plurality of output lines 860, one of which is energized according to the recognized character.

As explained, the particular counter in the feature counter group 54 operates at the timing of the signal on the line 853. The timing signal on the line 855 appears just after the timing signal on the line 852, and causes the comparison of the content of the feature counter group 54 with the content of the comparator 55. The result of the comparison is held on the line 517.

Figure 16:
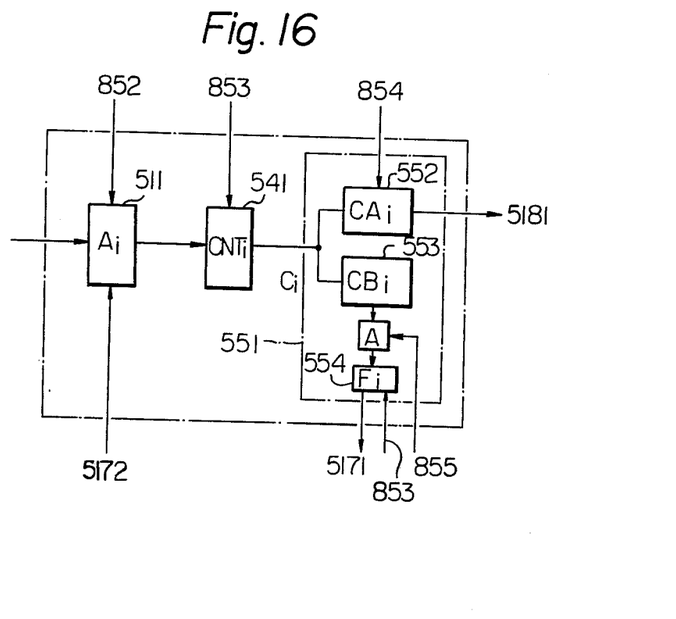
FIG. 16 is the detailed block-diagram of the main portion of FIG. 15.

FIG. 16 shows the block-diagram of one section of the apparatus of FIG. 15, and the i'th elements of the AND circuit group 53, feature counter group 54, and the comparator group 55 are shown. In FIG. 16, the reference numeral 511 ($A_i$) is the i'th AND circuit in the AND circuit group 53, 541 ($CNT_i$) is the i'th feature counter of the feature counter group 54, and 551 ($C_i$) is the i'th comparator of the comparator group 55. The counter control comparator 553 ($CB_i$) reads the pattern memory 31 word by word, and checks whether the word thus read is in the predetermined range every time the counter 541 operates. The output of the counter control comparator 553 is applied to the flip-flop 554 through the AND circuit (A) at the timing of the signal on the line 855. The output 5171 of the flip-flop 554 is applied to one input of the AND circuit $A_j$ ($j \neq i$, a plurality of $A_j$'s are possible) of the AND circuit group 53, and indicates whether the counter ($CNT_j$) should operate. The reset of the flip-flop 554 is carried out at the same time as the reset of the counter 541 by the timing signal on the line 853. The feature comparator 552 ($CA_i$) compares the content of the $CNT_i$ 541 with the content of the comparator 552 which is prepared beforehand at the timing of the line 854, after the scanning of the pattern memory 31 has finished, and the result of the comparison is set to the i'th bit of the feature hold register 56 in binary form through the line 5181.

Although the logic circuit 57 is embodied as a simple combination of AND circuits and OR circuits for the sake of simplicity of the explanation, an attachment which can calculate the number and the size of the pattern of the codes "I", "H", "V", and "S" involved in each branch of the character, is possible with the logic circuit.

Figure 17:
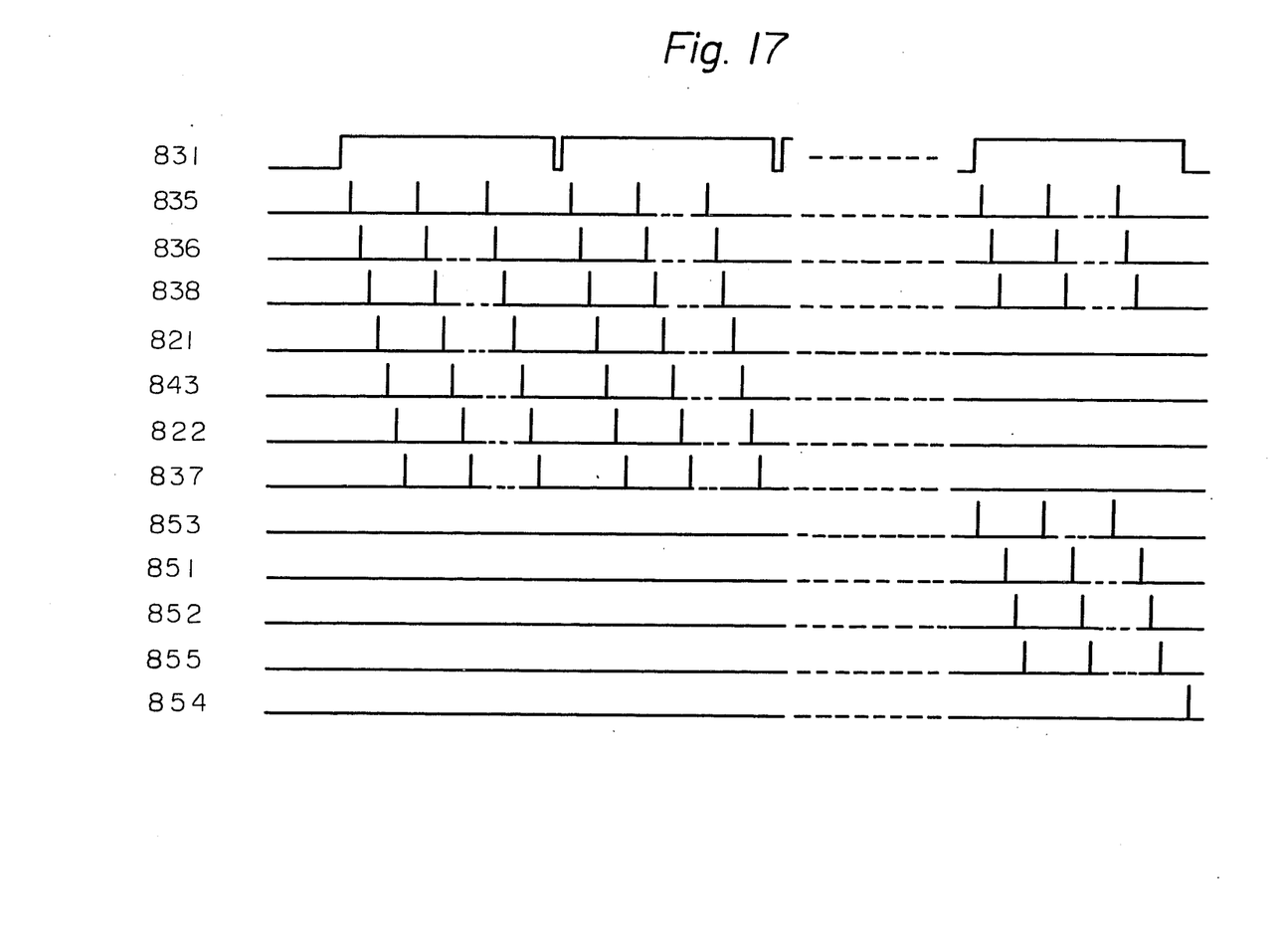
FIG. 17 shows the timing chart showing the operation of the control unit 60 in FIG. 7.

FIG. 17 is the time chart showing the operation of the control unit 60, concerning the scanning of the pattern memory 31 which relates commonly to the initial feature extraction process, the unification process, and the concentration process, and the recognition process. The reference numeral 831 show the signal which shows the direction of scannig, 835 is the timing signal for initiating the address of the pattern memory 31, 836 is the timing signal for stepping up the address of the pattern memory 31, 838 is the read drive signal to the pattern memory 31, 821 is the timing signal to set the content in the address thus stepped up of the pattern memory to the present register 41, 843 is the timing signal to transfer the result of the processes in the feature extraction unit 100 to the present register 41, 822 is the timing signal for transferring the content of the present register 41 to the pattern memory unit 30 and the past register 42, 837 is the write signal for the pattern memory, 853 is the reset signal for the counters and the flip-flops etc., in the recognition unit 50, 851 is the timing signal for transferring the word read from the pattern memory 31 to the buffer register in the recognition unit 50, 852 is the timing signal to operate the feature counter group 54 in the recognition unit 50, 855 is the timing signal for checking whether the content of the feature counter is in the predetermined range and causing the result of the check to hold in the flip-flop, and 854 is the timing signal to check whether the contents of each feature counter in the feature counter group 54 is in the predetermined ranges after scanning for the recognition process has finished, and cause the result of the check to hold in the feature hold register 56.

The structure of the control unit 60 will be obvious to those skilled in the art from the time chart in FIG. 17 and the above explanation, since the control unit 60 can be embodied using only a plurality of AND circuits and OR circuits and some flip-flops, and the design of such a digital circuit is easy for those skilled in the art.

As explained above in detail, the present character recognition system has only to process a pair of cells adjacent to each other at one time, and further, each point in the pattern area after extracting the feature have enough information concerning the character to be recognized, and thus the recognition process can be simplified. Accordingly, the present invention provides a character recognition system of simple structure which can recognize many characters.

From the foregoing it will now be apparent that a new and improved character recognition system has been found. It should be understood of course that the embodiments disclosed are merely illustrative and are not intended to limit the scope of the invention. Reference should be made to the appended claims, therefore, rather than the specification as indicating the scope of the invention.

What is claimed is:
1. A character recognition system comprising;
    (a) means for optically scanning a pattern area including a plurality of cells each having a binary value, and obtaining binary information relating to the black or white condition of each cell,
    (b) a digital memory for storing said binary information,
    (c) means for performing an initial feature extraction process for each cell in said digital memory, in which when the cell is white, it is encoded according to the presence of a character line in a predetermined direction from said white cell, and when the cell is black it is encoded according to the binary value adjacent to the black cell,
    (d) means for performing a unification process for each cell in said digital memory, in which the code of each cell is compared with the code of an adjacent cell using a past register and a present register for storing the codes, and substituting the code in one register for the code in the other register,
    (e) means for performing a concentration process for each cell in said digital memory after said unification process, said concentration process being, when the cell is black, the code of the first white cell in a predetermined direction from the black cell is attached to the code of the black cell, and when the cell is white, the code of the first white cell beyond the character line in a predetermined direction from the white cell is attached to the code of the white cell, and
    (f) means for performing a recognition process after the concentration process, the recognition process comprising the steps of scanning the concentrated code of each cell in the digital memory, counting a predetermined concentrated code on a predetermined sequence and condition, determining whether the counted value is in a predetermined range, and determining the character to be recognized.

2. A character recognition system comprising:
    (a) a scanning unit for scanning the character in a pattern area with M×N cells, and providing a binary value according to the black cells and the white cells thus scanned,
    (b) a pattern memory unit having M×N words of pattern memory, each word having a plurality of bits, each word storing information in each cell, said memory being written and read, word by word, during faster scanning in a predetermined direction,
    (c) a register unit including a present register which holds a word of the pattern memory and a past register which hold the preceding content of the present register in a preceding operational cycle,
    (d) a feature extraction unit including an initial feature extraction circuit and a unification circuit for comparing the content of the present register with the content of the past register and substituting the former with the latter according to a predetermined translation table, and a concentration circuit for processing the output of the unification circuit wherein when the cell is black, the code of the first white cell in a predetermined direction from the black cell is attached to the code of the black cell and when the cell is white the code of the first white cell beyond the character line in a predetermined direction from the white cell is attached to the code of the white cell,
    (e) a recognition unit for reading out each word after a concentration process from the pattern memory, counting the predetermined concentration code in a predetermined sequence and condition, determining whether the counted value is in a predetermined range, and determining the character to be recognized,
    (f) a control unit for supplying the timing pulses to each of the circuits.

3. A character recognition system according to claim 2, wherein said scanning unit has a CCD device for scanning the pattern area.

4. A character recognition system according to claim 2, wherein each word of the pattern memory has 21 bits, one bit for distinguishing the black and white cells, four bits for storing the feature of each cell, sixteen bits (=4×4) for storing the concentrated codes.

5. A character recognition system according to claim 2, wherein said recognition unit comprises;
   (a) a decode-logic circuit provided for every character to be recognized, for decoding the necessary input code and providing the logical sum of similar decoded codes using an OR circuit,
   (b) an AND circuit for applying a predetermined condition to the output of the decode-logic circuit,
   (c) a feature counter for counting the output of the AND circuit,
   (d) a comparator for determining if the content of the feature counter has reached the predetermined threshold value,
   (e) a feature hold register for holding a recognized character according to the output of the comparator, and
   (f) a logic circuit with a combination of a plurality of AND circuits and a plurality of OR circuits, said logic circuit having a plurality of output lines, the number of which is the same as that of the characters to be recognized, and an output signal corresponding to the recognized character according to the content of the feature hold register being applied to one of said output lines.

* * * * *